United States Patent
Barfield

[15] 3,686,792
[45] Aug. 29, 1972

[54] SYSTEM FOR SUPPLYING LIQUIDS TO POTTED PLANTS

[72] Inventor: William G. Barfield, 137 Tropical Lane, Corpus Christi, Tex. 78408

[22] Filed: Oct. 5, 1970

[21] Appl. No.: 77,949

[52] U.S. Cl. ............................47/39, 119/78, 47/38, 47/39
[51] Int. Cl. .............................................A01g 27/00
[58] Field of Search.........47/1.2, 34, 34.13, 38, 38.1, 47/39, 18; 119/78

[56] References Cited

UNITED STATES PATENTS

| | | | |
|---|---|---|---|
| 3,053,011 | 9/1962 | Silverman | 47/38 |
| 2,249,197 | 7/1941 | Brundin | 47/1.2 |
| 818,356 | 4/1906 | Davis | 47/38.1 |

FOREIGN PATENTS OR APPLICATIONS

| | | | |
|---|---|---|---|
| 903,148 | 2/1954 | Germany | 47/18 |
| 279,255 | 6/1969 | Austria | 47/38.1 |
| 477,156 | 10/1969 | Switzerland | 47/38.1 |

Primary Examiner—Robert E. Bagwill
Attorney—Hyer, Eickenroht, Thompson & Turner

[57] ABSTRACT

A plurality of pot plants are supported on generally the same level and liquid is supplied thereto by means of a main distribution conduit leading from a container for the liquid and a plurality of feeder conduits each leading from the main conduit to an individual pot plant.

8 Claims, 6 Drawing Figures

PATENTED AUG 29 1972

William G. Barfield
INVENTOR.

BY Dyer, Eickenroht,
Thompson & Turner
ATTORNEYS

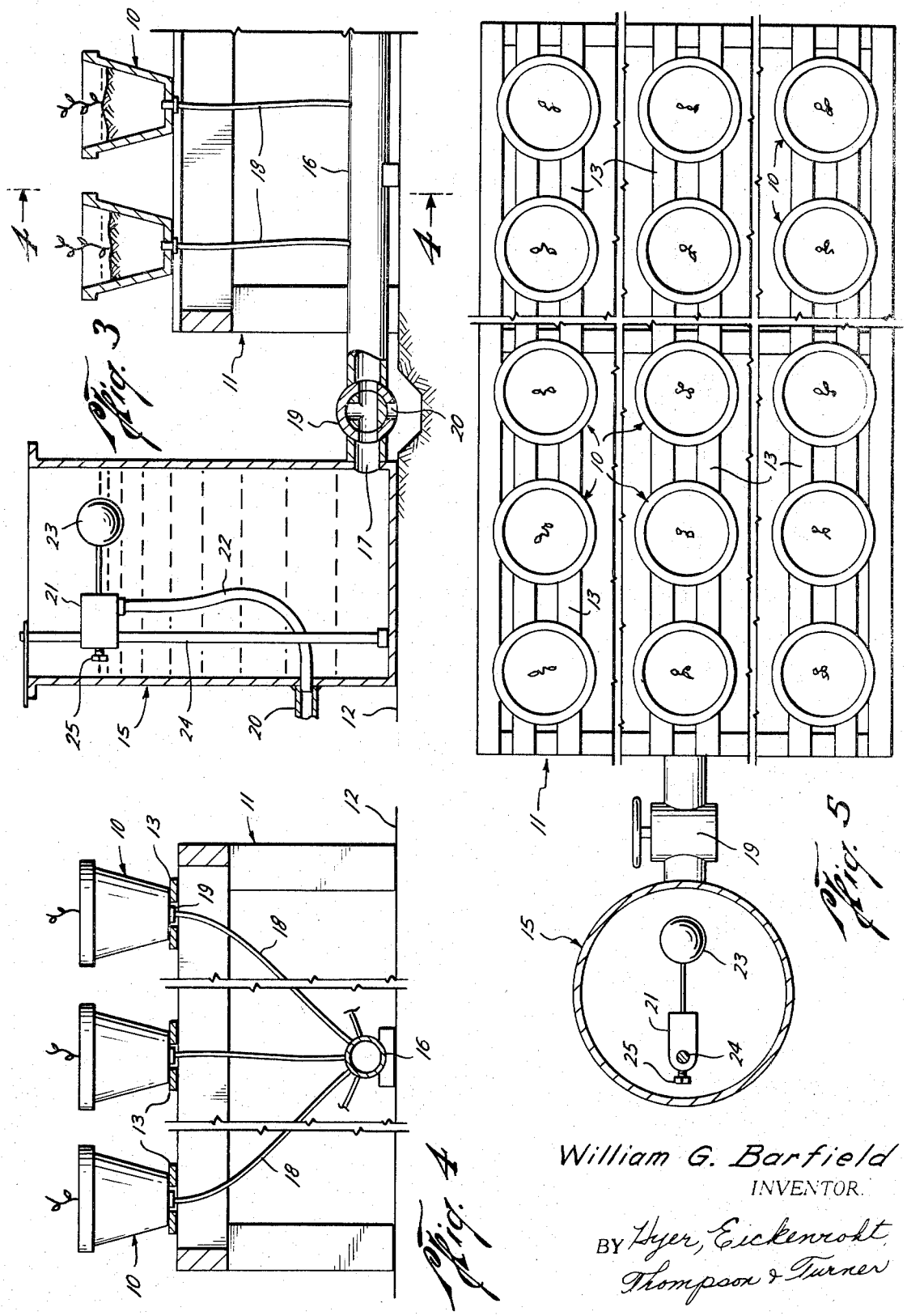

SYSTEM FOR SUPPLYING LIQUIDS TO POTTED PLANTS

This invention relates to an improved system for supplying liquids such as water and/or fertilizer to potted plants within a greenhouse or other area where large numbers of them are usually grouped in rows and in relatively close proximity to one another.

In a system of this general type shown and described in U.S. Pat. No. 3,085,364 to Chapin, liquid is supplied from a suitable source to a main distribution conduit and from the main conduit in equal amounts to feeder conduits each having an outer end leading to an individual pot. Such a system has the advantage, of course, of lessening the time and labor which personal attention to each pot would require, not to mention the inherent inaccuracy in attempting to supply equal amounts of liquid to each plant. At the same time, there is no serious interruption in the normal greenhouse routine inasmuch as the replacement of any pot with another merely requires repositioning of the end of one of the feeder conduits.

However, it has been found that, in the Chapin system, the liquid does not thoroughly wet the plants. Also, the liquid to be supplied is measured by apparatus which is complicated and requires frequent settings in order to obtain the desired wetting of the plants.

The object of the present invention is to provide a system which insures that the plants are thoroughly wetted and which requires a minimum of attention and water supply.

A more particular object is to provide such a system which is simple and inexpensive in construction and which requires few if any non-standard parts.

These and other objects are accomplished, in accordance with the illustrated embodiment of the invention, by a system in which each of the feeder conduits extending from the main conduit is releasably fluidly connected at its outer end to a hole in the lower end of one of the pots. I have found that liquid introduced into the pot in this manner will, in travelling upwardly therethrough, thoroughly wet the soil in which the plant is growing. Also, in at least one exemplary practice of my invention, this enables use of the existing hole formed in the bottom of conventional pots of this type.

The pots are supported on generally the same level, and liquid is supplied to the main conduit through a container disposed to one side of the supported pots. More particularly, I provide a means for automatically controlling the supply of liquid into an inlet to the container so as to maintain a selected level of such liquid within the container and thus in each of the pots. Consequently, even though the liquid will flow upwardly through the soil in the pots at slow rates, and usually at different rates, the system will continue to supply liquid until the desired level is reached, and will then maintain that level, without the need for constant supervision. More particularly, I provide a further means for adjusting the level at which the liquid is to be maintained, whereby my system is adaptable for use with pots of different sizes or pots supported on different levels, or in wetting the pots to different levels.

In the practice of my invention wherein the ends of the feeder tubes are connected to existing holes in the bottom of the pots, I provide a support for the pots which has holes in it over which holes in the pots may be disposed, so that the feeder tubes may extend upwardly through the holes in the support. In another practice of my invention, I provide specially constructed pots having holes to one side of the bottom, so that the ends of the feeder tubes may be releasably connected thereto even when the support is of solid construction, or when it is impractical to align holes in the bottom of the pots with holes in the support.

In the drawings, wherein like reference characters are used throughout to designate like parts:

FIG. 3 is a vertical sectional view of the other end of the system;

FIG. 4 is a vertical sectional view of the system, as seen along broken line 4—4 of FIG. 3;

FIG. 5 is a plan view of the system; and

With reference now to the details of the above-described drawings, the system shown in FIGS. 1 to 5 includes pots 10 arranged in longitudinally and laterally extending rows and supported by a table 11 at a desired elevation above a base surface 12. As shown, the upper side of the table lies in a generally horizontal plane so as to support each of the pots 10 on substantially the same level and each of the pots 10 is of substantially the same size so that the soil in which the plants are growing is at generally the same level (see FIG. 3).

Figure 1:
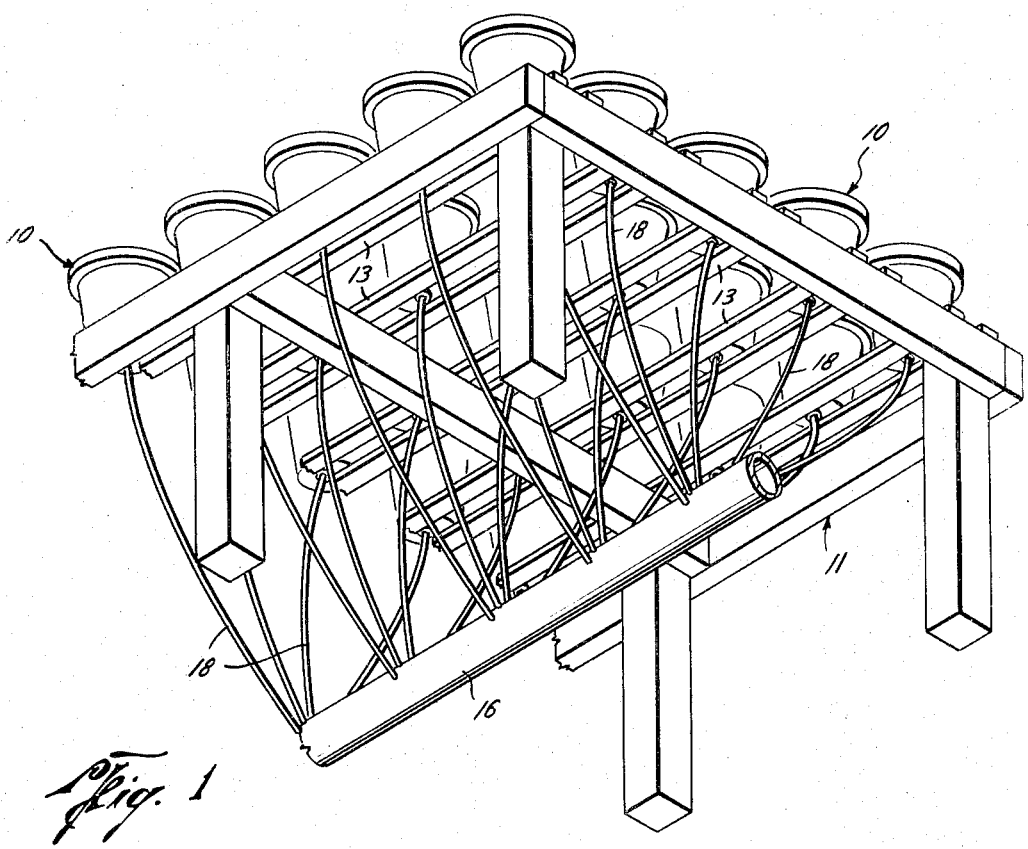
FIG. 1 is a perspective view from the bottom and one corner of one end of a system constructed in accordance with the present invention.

As shown in FIG. 1, there may be five longitudinally extending rows of pots 10, and, as indicated by the interrupted lines in FIG. 5, there may be an even larger number of laterally extending rows of pots. In any event, as is the usual case within a greenhouse, the pots are grouped in large numbers and in relatively close proximity to one another.

The upper side of the table 11 is made up of a plurality of spaced-apart slats 13 extending its full length. The spacing of adjacent slats is such that they will support each pot 10 with the hole 14 in the bottom thereof above the space between them. As previously described, a pot of this construction is conventional in this art.

A container 15 for the liquid to be supplied to the pots 10 is supported upon the base surface 12 near one end of the table 11. As previously described, the liquid to be supplied may be water or fertilizer, or a combination of the two. In any event, the container 15 and table are so related that the upper end of the container is at least as high as the upper ends of the potted plants 10. Liquid is supplied from the container to the pots by means of a main distribution conduit 16 connected with and extending from an outlet 17 in the lower end of the container, and a plurality of feeder conduits 18 each extending from the main conduit to an individual pot. The main conduit 16 is of relatively large diameter so as to simultaneously supply liquid to the large number of feeder conduits 18, and extends beneath the table where it will not interfere with the arrangement and/or movement of the pots. The feeder tubes are preferably made of lightweight flexible plastic to facilitate their manipulation as they are connected to and disconnected from the pots.

Figure 2:
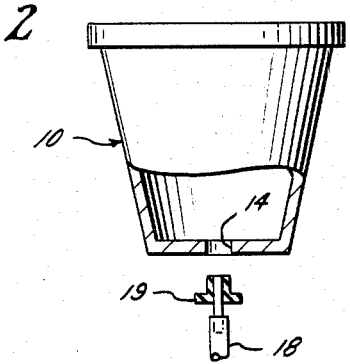
FIG. 2 is a side view, partly in section, of one of the pots of the system of FIG. 1 and the end of a feeder tube positioned for connection to the hole in the bottom thereof.

As best shown in FIG. 2, the outer end of each feeder conduit 18 is provided with a hollow plug 19 of rubber or the like for fitting tightly into the bottom hole 14 in each pot. Thus, as best shown in each of FIGS. 1 and 4, the ends of the feeder conduits extend upwardly through the spaces between the slats 13 supporting the pots to permit insertion of the plugs 19.

In the use of this system, water from the container 15 will, by virtue of its head (see FIG. 3), flow through the main conduit 16 and upwardly through feeder conduits 18 into the lower ends of the pots. As previously mentioned, I have found that this method of feeding the liquid will cause it to thoroughly wet the soil in the pot as it moves slowly therethrough in seeking its level in the pot corresponding to the level of liquid in the container 15 (see the broken lines in FIG. 3).

In the event the number of pots to be wetted is less than the number of feeder conduits, the outer ends of the latter may be closed in any suitable manner. Also, when a particular pot 10 is to be replaced with another pot in the system, it's merely necessary to pull the plug 19 from the hole 14, replace the existing pot with a new one, and then reinsert the plug 19.

As shown in FIGS. 3 and 4, a three-way valve 19 is connected in the main conduit 16 intermediate the outlet 17 in the container and the first group of feeder conduits 18. In its position shown in FIG. 3, the valve 19 connects the container with the main conduit for supplying liquid to the plants in normal usage of the system. As will be understood from FIG. 3, however, the valve may be turned to an alternate position (not shown) in which it would connect the main conduit with only a drain opening 20 in the lower end of the valve so as to permit the pots to be drained independently of the container. In another alternative position (also not shown), the valve 19 would connect both the container and main conduit with the drain opening.

Figure 6:
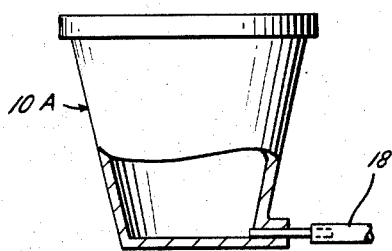
FIG. 6 is a side view, partly in section, of a specially constructed pot and having a hole to one side of the bottom thereof and the end of a feeder tube connected thereto.

As illustrated in FIG. 6, liquid may instead be introduced into pots 10A having the holes disposed to one side of the bottom thereof, so as to receive the end of a feeder conduit 18. In this manner, the bottom of the pots may be supported on a table having a solid upper side, or alternatively on a table in which the slats or other spaces are not arranged for conveniently receiving the ends of the feeder conduits. With this side insertion of the ends of the feeder conduits, it would normally not be necessary to provide a plug, such as that indicated at 19 in FIG. 2, for tightly engaging within the hole in the pot.

Liquid is automatically maintained at a desired level within the container 15 by more of less conventional apparatus for controlling the supply of liquid to the inlet 20 of the container from any suitable source, which may be the normal city water tap. Fertilizer or other additives may be introduced to the container through its open end.

As shown in FIGS. 3 and 5, this apparatus includes a valve 21 mounted on a post 24 in the container and connected by a flexible conduit 22 to the container inlet 20, and a float 23 for causing the valve to open and close. As well known in the art, the float is adapted to rise and fall in response to the level of the liquid within the container 15, and the valve 21 is opened as the float 23 falls and is closed as the float 23 rises so as to supply liquid to the container when it drops below the predetermined level.

Thus, the valve and float will automatically admit liquid to the container 15 in sufficient quantities to fill each of the pots 10 to and maintain them at a level corresponding to that in the container. Furthermore, this will occur without supervision, even though the pots will fill rather slowly with the liquid and further even though several pots will usually fill at different rates. As will be appreciated by those skilled in the art, in the absence of my system, this filling procedure could require a considerable amount of a person's time.

As shown in FIG. 3, the float is arranged at an elevation within the container 15 which will maintain a level of liquid in each of the pots which is above the soil in the pot and a half an inch or so below the upper end of the pot. In order to maintain a different level, if desired, the valve 21 is slidable vertically along the post 24 and adapted to be fixed in the desired position by a set screw 25. The flexibility of the hose 22 will, of course, maintain the necessary communication between the container inlet 20 and the valve 21 regardless of the elevation of the valve within the container.

From the foregoing it can be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a system for supplying liquids to plants within pots each having a hole in the lower end and supported on generally the same level, apparatus comprising a container for the liquid having an inlet and an outlet and adapted to be disposed to one side of said supported pots, a main distribution conduit connecting with the container outlet, a plurality of flexible feeder conduits each extending from the main conduit for releasable fluid connection at its outer end with the hole in an individual pot, means for automatically controlling the supply of liquid through the inlet so as to maintain a selected level thereof within the container and thus in each of said pots, and means for adjusting the level at which said liquid is maintained.

2. A system of the character defined in claim 1, wherein the outer end of each feeder tube has a plug tightly fittable into the hole in the pot.

3. A system of the character defined in claim 1, including means for emptying liquid within said main conduit, feeder conduits and pots, while closing said outlet conduit to contain liquid within the container.

4. A system of the character defined in claim 1, wherein the supply controlling means comprises a valve connected to the inlet, and a float for opening and closing the valve responsive to the liquid level within the container.

5. A system of the character defined in claim 4, wherein the adjusting means comprises means for raising and lowering the valve and float in the container.

6. A system for wetting plants, comprising pots for the plants each having a hole in its lower end, means for supporting the pots on generally the same level, a liquid container to one side of the supported pots, said container having an inlet and an outlet, a main distribution conduit connecting with the container outlet and extending below the pots, a plurality of feeder conduits each extending from the main conduit and releasably fluidly connected at its outer end to the hole in a pot, means for automatically controlling the supply of liquid through the inlet so as to maintain a selected level of said liquid within the container and thus in each of said pots, and means for adjusting the level at which said liquid is maintained.

7. A system of the character defined in claim 6, wherein said supporting means has holes therein, and the holes in the pots are over the holes in the supporting means, said feeder tubes extending upwardly through holes in the supporting means.

8. A system of the character defined in claim 6, wherein the outer ends of the feeder tubes connect with holes to one side of the bottom of the pots.

* * * * *